(12) United States Patent
Sultenfuss et al.

(10) Patent No.: US 9,372,521 B2
(45) Date of Patent: Jun. 21, 2016

(54) SYSTEMS AND METHODS FOR PROVIDING AUXILIARY RESERVE CURRENT FOR POWERING INFORMATION HANDLING SYSTEMS

(71) Applicants: Andrew T. Sultenfuss, Leander, TX (US); Gary J. Verdun, Georgetown, TX (US)

(72) Inventors: Andrew T. Sultenfuss, Leander, TX (US); Gary J. Verdun, Georgetown, TX (US)

(73) Assignee: Dell Products LP, Round Rock, TX (US)

( * ) Notice: Subject to any disclaimer, the term of this patent is extended or adjusted under 35 U.S.C. 154(b) by 561 days.

(21) Appl. No.: 13/827,757

(22) Filed: Mar. 14, 2013

(65) Prior Publication Data

US 2014/0281618 A1 Sep. 18, 2014

(51) Int. Cl.
*G06F 1/26* (2006.01)
*G06F 1/30* (2006.01)

(52) U.S. Cl.
CPC . *G06F 1/30* (2013.01); *G06F 1/263* (2013.01)

(58) Field of Classification Search
CPC ............. G06F 1/26; G06F 1/30; G06F 1/263; G06F 2212/2022; G06F 3/0619; G06F 11/2015
See application file for complete search history.

(56) References Cited

U.S. PATENT DOCUMENTS 7,999,520 B2 8/2011 Luo et al.
8,125,200 B2 2/2012 Tsai et al.
2010/0257529 A1* 10/2010 Wilkerson et al. ............ 718/102
2011/0302432 A1* 12/2011 Harris et al. .................. 713/320
2014/0108846 A1* 4/2014 Berke et al. ................... 713/340

OTHER PUBLICATIONS

Intel Technology Journal, "Mobile PC Platforms Enabled With Intel Centrino Mobile Technology", vol. 7, No. 2, May 21, 2003, 12 pgs.
CNET News, "Explaining Intel's Turbo Boost Technology", Printed from Internet Feb. 13, 2013, 6 pgs.
"Intel Mobile Voltage Positioning Technology Overview", New Mobile Voltage Regulation Technology for Intel Mobile Pentium III Processors, Printed from Internet Feb. 9, 2013, 5 pgs.
Intel, "Intel Core 2 Duo Processor and Intel GM45 Express Chipset (With DDR3 System Memory)", Development Kit User's Manual, Sep. 2008, 81 pgs.
Intel, "$2^{nd}$ Generation Intel Core Processor Family With Intel 6 Series Chipset Development Kit", User Guide, Mar. 2011, 59 pgs.
Wikipedia, Electric Double-Layer Capacitor), Printed from Internet Mar. 13, 2013, 16 pgs.
Reddy, "Systems and Methods for Providing Supplemental Power to Battery Powered Information Handling Systems", U.S. Appl. No. 13/495,631, filed Jun. 13, 2012, 37 pgs.

* cited by examiner

*Primary Examiner* — Mohammed Rehman
*Assistant Examiner* — Alyaa T Mazyad
(74) *Attorney, Agent, or Firm* — Egan, Peterman, Enders & Huston LLP

(57) ABSTRACT

Systems and methods are disclosed for providing auxiliary reserve current to power a system load of an information handing system using an auxiliary energy storage power source as an energy cache to selectably provide auxiliary reserve current to at least partially supplement the normal operating power supply (e.g., battery pack, AC adapter, AC/DC power source, etc.) of an information handling system during temporary times of increased current need by the system load of the information handling system.

39 Claims, 4 Drawing Sheets

SYSTEMS AND METHODS FOR PROVIDING AUXILIARY RESERVE CURRENT FOR POWERING INFORMATION HANDLING SYSTEMS

FIELD OF THE INVENTION

This invention relates generally to information handling systems, and more particularly to providing auxiliary reserve current for powering information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems employ central processing units (CPUs) to perform processing tasks for the system. Some CPUs are configured to operate in a "Turbo Boost" mode during which the CPU is enabled to run at a higher clock rate than its base operating frequency (referred to as dynamic CPU overclocking) during periods of high processing demand as requested by the operating system (OS) of the information handling system. CPU processor performance states are typically defined for a CPU by the Advanced Configuration and Power Interface (ACPI) specification, and the OS typically requests the highest CPU performance state for the maximum Turbo Boost mode, which is typically limited only by electrical (power, current) and thermal limits of the CPU. Thus, Turbo Boost mode may be allowed upon OS request as long as the CPU remains within its defined electrical and thermal limits, and/or based on other parameters. For example, the OS may request maximum processor frequency (ACPI P0) and the power management unit (PMU) of the CPU may allow or deny the request based upon number of active processor cores, estimated current, estimated power and processor temperature if and how much turbo will be applied.

Turbo boost implementation provides advantage for burst type operations which are typical of client type workloads. During turbo boost, the CPU is allowed to operate significantly higher than the (Thermal Design Power) TDP for short periods of time. When workloads are bursty in nature this results in the processor performance appearing to be that of a processor operating at a much higher frequency. The side effect is the need to design the power delivery system to support these very high peak power demands. When a system is operating on battery power these power peaks must be supplied by the battery, when operating on AC adapter these power peaks must be supplied by AC adapter during low battery conditions.

During system operation, implementation of maximum turbo boost mode can cause very high instantaneous peak supply current ($I_{CC}$) inrush to the CPU that can temporarily overwhelm the power delivery system for an information handling system, such as the battery pack and/or AC adapter of a battery-powered information handling system such as a notebook computer or tablet computer. This is true even for relatively low power information handling systems. For example, maximum $I_{CC}$ generation for an information handling system with average power draw of 15 Watts can reach 50 Watts during initiation of Turbo Boost mode. Conventional ways of accommodating high power demand for a Turbo Boost mode include over designing the power delivery system including AC adapter and battery power capacity. However, such over-designed (higher capacity) AC adapters and batteries result in increased system weight, system cost, and heat generation during operation. Larger over-designed batteries take up additional space and increase system weight, such that they are often not practical for modern portable information handling system devices. Consequently, smaller batteries are typically used for such portable devices, which compounds the high $I_{CC}$ input power problem during Turbo Boost mode operation.

Large banks of capacitors have been coupled to a supply current node for a processor to help satisfy high processor inrush current in desktop information handing system applications. In such conventional applications, the capacitor banks are continuously coupled to the current supply node for the processor, and therefore require high continuous supply current to be delivered at all times to both the capacitor bank and the processor load. Such capacitor banks are typically too large to be practical for mobile battery-powered applications, and suffer relative high energy leakage due to capacitance equivalent series resistance (ESR), even at relatively low stand by voltage levels, due to large capacitance value required.

SUMMARY OF THE INVENTION

Disclosed herein are systems and methods for providing auxiliary reserve current to power a system load of an information handing system, such as a battery powered information handling system like a notebook computer, tablet computer, etc. In one embodiment, the disclosed systems and methods may be implemented to provide a low latency auxiliary energy storage power source as an energy cache to selectably provide auxiliary reserve current to at least partially supplement the normal operating power supply (e.g., battery pack, AC adapter, AC/DC power source, etc.) of an information handling system during temporary times of increased current need by one or more multi-power mode processing devices of the system load of the information handling system. Advantageously, the disclosed systems and methods may employ an auxiliary energy storage power source to selectably provide auxiliary reserve current to at least partially supplement normal operating power supply from an information handling system battery during battery-only operation of the system, thus allowing improved performance without increasing battery size or weight.

Examples of such temporary increased current need for an information handling system include, but are not limited to, temporary increased current need to support high instantaneous peak supply current ($I_{CC}$) associated with a higher powered operation mode of a multi-power mode processing device (e.g., such as a CPU "Turbo Boost mode" or similar high powered operation mode for a graphics process unit "GPU") during which the processing device is enabled to run at a higher clock rate than its base operating frequency (i.e., dynamic overclocking). In other examples, such a Turbo Boost or other higher powered operation mode may be used to implement multiprocessing additions (e.g., addition of more processing cores), and to implement GPU multi GPU operations. Such a higher power operating mode may be implemented, for example, during periods of high processing demand as requested by the operating system (OS) of the information handling system, and allowed by a PMU of a CPU.

In one embodiment, a reserve current system may be provided that includes a first stage regulation system to support and supplement the current provided from a voltage regulator (VR) (e.g., an external or integrated voltage regulator) to an information handling system CPU, GPU or other multi-power mode processing device. The reserve current system may further include an auxiliary energy storage power source (auxiliary power buffer or power cache) in the form of one or more local energy storage elements provided at the processing device regulator and designed to handle some or most of the peak processing device power demand above average normal power level portion provided by the core regulator ("Ptdp"). Examples of local energy storage elements for an auxiliary energy storage power source include, but are not limited to, capacitive energy storage devices (e.g., capacitors or super capacitors), auxiliary battery or batteries, and/or other energy storage device/s. The reserve current system may be configured to operate in an auxiliary power mode to temporarily provide auxiliary reserve current to supplement voltage regulator (VR) base current provided to a multi-power mode processing device to satisfy current requirements that occur during the times that the multi-power mode processing device operates in a higher or peak power mode (such as during a "Turbo Boost" or other higher powered operation mode). In this way, the power delivery system from the VR back to the battery and/or AC adapter advantageously need only be designed to be sufficient to handle the TDP power plus the time based average power requirements for charging and recharging of the auxiliary energy storage power source (i.e., boost storage circuit).

The auxiliary reserve current may be so provided from the reserve current system to at least partially make up for the difference between the elevated temporary peak current inrush requirement of the processing device and the available current required to satisfy Ptdp from the power supply capacity of the normal operating power supply of the information handling system. In one exemplary embodiment, the reserve current system may include power detection circuitry that is configured to detect initiation or cessation of a peak power event (e.g., such as CPU Turbo Boost mode), a signaling interface configured to indicate regulator condition/readiness, charge control circuitry for controlling charging of the auxiliary energy storage power source (capacitor/s), and a power control circuit to selectively enable and disable the auxiliary power mode of the reserve current system. In one exemplary embodiment, one or more components of the reserve current system may be integrated within circuitry of the VR itself. In this regard, command states are well understood by the VR and allow Synchronous and Asynchronous operations for higher operation mode (e.g., Turbo Boost) support as well as command position to react to excursions for proper error or state change conditions.

In one embodiment, the auxiliary energy storage power source may be temporarily connected to provide auxiliary reserve current to supplement the base supply current (e.g., corresponding to Ptdp) provided by a voltage regulator (VR) to a multi-mode processing device, and then disconnected from the multi-mode processing device and charged at a rate that is independent from the base supply current. The auxiliary energy storage power source may also be selectably charged from a circuit node that is different from the input power node of the processing device, and may be disconnected from charging when the multi-mode processing device is in a non-operating standby power mode so as to reduce or substantially prevent current leakage during such times. The auxiliary energy storage power source may also be voltage matched to the VR output before auxiliary reserve current insertion, and the auxiliary reserve current may be dynamically applied just prior to or simultaneously with initiation of a higher power operation mode. Advantageously, in one embodiment, the auxiliary reserve current may only be inserted into the supply node of the multi-mode process when needed, and disconnected at all other times.

In one respect, disclosed herein is an information handling system, including: at least one multi-power mode processing device that is configured to operate in a first power mode having a first power consumption level and to temporarily operate in a separate second higher power mode having a second power consumption level, the second power consumption level being greater than the first power consumption level; voltage regulator (VR) circuitry having an input coupled to receive an input system power source and an output coupled to provide power to the multi-power mode processing device, the VR circuitry being configured to regulate current received from the input system power source to produce a base regulated current output that is sufficient to power the multi-power mode processing device at the first power consumption level but not at the second power consumption level; and a reserve current system including an auxiliary energy storage power source that includes one or more energy storage devices coupled to be selectably charged with stored energy taken from the input system power source, and the reserve current system being configured to selectably release the stored energy from the auxiliary energy storage power source as auxiliary reserve current sufficient to supplement the base regulated current of the VR circuitry output to power the multi-power mode processing device at the second power consumption level. The reserve current system may be configured to selectably provide a temporary pulse of the auxiliary reserve current to supplement the regulated base current provided to the multi-power mode processing device during the time when the multi-power mode processing device is operating in the second power mode.

In another respect, disclosed herein is a method for providing auxiliary reserve current to power a multi-power mode processing device of an information handing system. The method may include the steps of: operating the multi-power mode processing device in a first power mode having a first power consumption level and temporarily operating the multi-power mode processing device in a separate second higher power mode having a second power consumption level, the second power consumption level being greater than the first power consumption level; receiving current from an input system power source in an input of a voltage regulator (VR) circuitry and regulating the received input current to produce a base regulated current output that is sufficient to power the multi-power mode processing device at the first power consumption level but not at the second power consumption level; selectably charging one or more energy storage devices of an auxiliary energy storage power source with stored energy taken from the input system power source; and selectably releasing the stored energy from the auxiliary energy storage power source as a temporary pulse of auxiliary reserve current sufficient to supplement the base regulated current of the VR circuitry output to power the multi-power mode processing device at the second power consumption level when the multi-power mode processing device is operating in the second power mode.

DESCRIPTION OF ILLUSTRATIVE EMBODIMENTS

Figure 1:
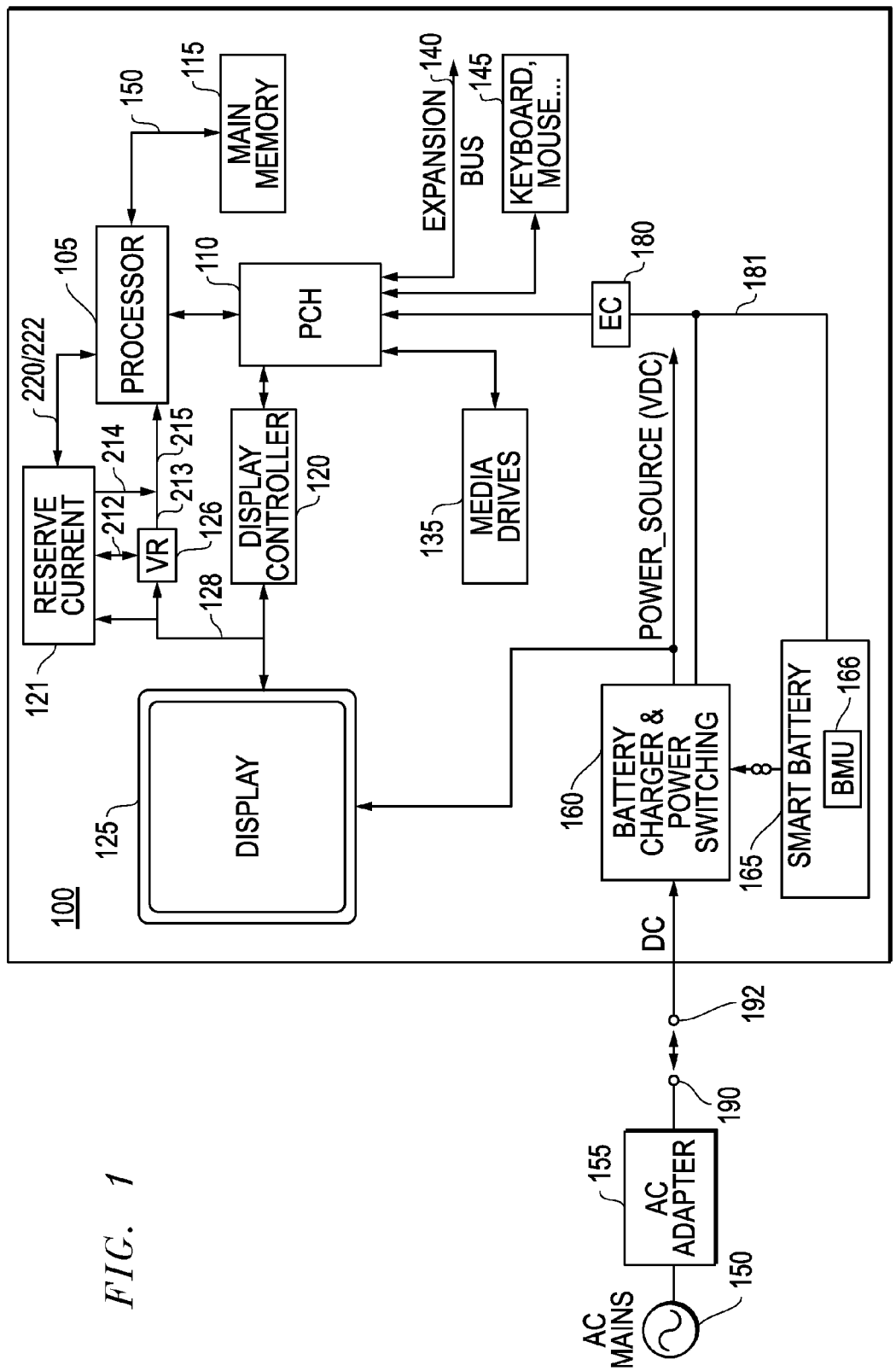
FIG. 1 is a block diagram illustrating an information handling system according to one exemplary embodiment of the disclosed systems and methods.

FIG. 1 is a block diagram of a battery powered information handling system 100 (e.g., portable information handling system such as notebook computer, MP3 player, personal data assistant (PDA), cell phone, cordless phone, etc.) as it may be configured according to one exemplary embodiment of the disclosed systems and methods. In this regard, it will be understood that the configuration of FIG. 1 is exemplary only, and that the disclosed systems and methods may be implemented on any other type of information handling system (e.g., non-battery powered information handling system such as desktop computer, server, etc.).

As shown in FIG. 1, information handling system 100 of this exemplary embodiment includes at least one multi-power mode processing device 105 which may be a central processing unit (CPU) such as an Intel Pentium series processor, an Advanced Micro Devices (AMD) processor or other multi-power mode processing device that is configured with multiple power modes that vary over time (e.g., with each of the power modes having a different required power level that corresponds to a different real time processing requirement). Although FIG. 1 illustrates a multi-power mode processing device 105 in a CPU configuration, it will be understood that the disclosed systems and methods may be similarly implemented for providing auxiliary reserve current to any other type of multi-power mode processing device including, but not limited to, graphics processor unit (GPU), graphics-derivative processors such as physics/gaming processors, etc.

In the particular illustrated embodiment of FIG. 1, multi-power mode processing device 105 may be a CPU that executes an operating system (OS) for system 100. In such an exemplary embodiment, the multiple power modes of processing device 105 may include, for example, at least one first (e.g., normal or default) operating power mode having a clock rate equal to a base operating frequency and/or that does not exceed the CPU rated thermal design power (TDP), and at least one temporary (e.g., pulsed) second higher power mode (e.g., such as Intel "Turbo Boost" mode) during which the multi-power mode processing device 105 is enabled to run at a higher clock rate than its base operating frequency (dynamic CPU overclocking) and/or that exceeds the CPU TDP. Such a temporary second higher power mode may be initiated, for example, during periods of high processing demand as may be requested by the OS of the information handling system 100 and approved or otherwise allowed by a PMU of CPU 105. Such a a temporary second higher power mode may be terminated when processing device reaches its maximum allowable operating temperature (i.e., no thermal headroom is left).

Still referring to the exemplary embodiment of FIG. 1, CPU 105 may be provided in one embodiment with an integrated memory controller (iMC) to facilitate memory functions, although it will be understood that a memory controller may be alternatively provided as a separate chip or other circuit in other embodiments. Main system memory 115 may be coupled via DDR channel 150 as shown to CPU 105. A display 125 (e.g., LCD display or other suitable display device) is coupled to display controller 120 to provide visual images (e.g., via graphical user interface) to the user. Display controller 120 is in turn coupled to processing device 105 via platform controller hub (PCH) 110 which facilitates input/output functions for the information handling system 100. Display controller may alternatively be located in the processor chip, e.g., such as mobile architectures. Local system storage 135 (e.g., one or media drives such as hard disk drive/s, optical drives, NVRAM, Flash or any other suitable form of internal or external storage) may be coupled to PCH 110 and its controller chip to provide permanent storage for the information handling system 100. Input devices 145 (e.g., such as a keyboard, mouse, touchpad, touchscreen, etc.) may be coupled as shown to PCH 110 and its controller chip to enable the user to interact with the information handling system 100 and programs or other software/firmware executing thereon. An expansion bus 140 may be coupled to PCH 110 to provide the information handling system 100 with additional plug-in functionality. Expansion bus 140 may be, for example, a PCI bus, PCI Express bus, SATA bus, USB or any other suitable expansion bus. An embedded controller (EC) 180 running system BIOS may also be coupled to PCH 110 as shown.

In this particular embodiment, information handling system 100 is a battery-powered information handing system that is coupled to a source of system (DC) power 128, namely AC mains 150 and AC adapter 155. It will be understood that externally sourced DC power 128 may be alternatively provided from any other suitable external source (e.g., external DC power source) or that AC adapter 155 may alternatively be integrated within an information handling system 100 such that AC mains 150 supplies external AC power directly to information handling system 100 and AC power is internally converted to system power 128 within information handling system 100. In the illustrated embodiment, information handling system 100 also includes an internal DC power source (e.g., smart battery pack 165) that is configured to provide system power source 128 for the system load of information handling system 100, e.g., when an external source of system power 128 is not available or not desirable. In one exemplary embodiment, information handling system 100 may be a portable battery-powered information handing system that is primarily powered by battery pack 165 which is only occasionally recharged by system (DC) power 128, such as a tablet computer, notebook computer, cell phone, PDA, etc.

As shown in FIG. 1, AC adapter 155 is removable from battery charger and power switching circuitry 160 of information handling system 100 at mating interconnection terminals 190 and 192 such that information handling system 100 may be powered from batteries of battery pack 165 alone. AC adapter may also be optionally and temporarily coupled at terminals 190 and 192 to battery charger and power switching circuitry 160 in order to provide information handling system 100 with a source of system power 128 as an alternative and/or in addition to system power 128 provided by battery cells of a battery system in the form of smart battery pack 165, e.g., lithium ion ("Li-ion"), nickel metal hydride ("NiMH"), nickel cadmium (NiCd), or lithium-polymer (Li-polymer) battery pack including one or more rechargeable batteries and a BMU that includes an analog front end ("AFE") and microcontroller. Further, a battery system data bus (SMBus) 181 is coupled to smart battery pack 165 to provide battery state information, such as battery voltage, current and charge level information, from BMU 166 of smart battery pack 165 to embedded controller 180. Battery charger and power switching circuitry 160 of information handling system 100 may also provide DC power for recharging battery cells of the battery system 165 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load of the information handling system and to exchange data with one or more processing devices of the information handling system.

In one embodiment, each of the possible sources of system power 128 for information handling system 100 (e.g., external AC adapter 155, smart battery pack 165, etc.) may be sized to have an individual or combined power rating that is sufficient to meet the total anticipated current and power requirements of information handling system 100 when multi-power mode processing device 105 is operating at its first default operating power mode (e.g., Ptdp) during periods of normal processing demand (e.g., such as non-overclocked operation mode in which the processing device does not run above its base operating frequency and does not exceed its TDP). However, any given one or more of these same possible power sources for information handling system 100 may be sized to have an individual or combined power rating that is not sufficient to meet the total anticipated current requirements for information handling system 100 when multi-power mode processing device 105 transitions to a second higher power mode during periods of high processing demand (e.g., such as transition to a dynamic overclocking mode like "Turbo Boost" mode in which the processing device runs at a higher clock rate than its base operating frequency, initiates multi-processing addition of more processing cores, implements multi GPU operations, and/or otherwise exceeds its rated TDP. In such an embodiment, multi-power mode processing device 105 may be configured to transition in real time between the first lower power mode and the second higher power mode, for example, in response to OS request, sensed real time processing requirements for current required or requested system operating tasks, and/or in response to user or system commands, etc.

Still referring to the embodiment of FIG. 1, core (DC-to-DC) voltage regulation circuitry (VR) 126 is shown coupled to receive system power source 128 and to provide a base regulated current 213 (e.g., corresponding to Ptdp) for multi-power mode processing device 105. In one exemplary embodiment VR 126 may include voltage regulator circuitry that is configured to vary processor input voltage ($V_{CC}$) based on relative processing activity (e.g., processing load) of multi-power mode processing device 105 such as using Intel Mobile Voltage Positioning (IMVP) methodology that dynamically reduces the processor input voltage (Vcc) based on monitored processor activity in order to reduce processor power, e.g., by maintaining a relatively higher processor input voltage (Vcc) during periods of lower processor activity state and lower power demand, and by lowering the processor input voltage (Vcc) during periods of higher processor activity and higher power demand. In one embodiment, VR 126 may be separate from (i.e., external to) multi-power mode processing device 105. However, in another embodiment, VR 126 may be integrated on package with multi-power mode processing device 105 as an integrated voltage regulator (IVR).

In one embodiment, the maximum capacity of base regulated current 213 provided from VR 126 is alone sufficient to power multi-power mode processing device 105 when processing device 105 is operating in a first (e.g., normal or default) lower power operating power mode (e.g., Ptdp), but is not alone sufficient to power multi-power mode processing device 105 when processing device 105 operates in a temporary second higher power mode (e.g., dynamically overclocked or peak power mode, multiprocessing addition of more processing cores, initiation of multi GPU operations, etc.) such as previously described. As further shown, a reserve current system 121 is present to selectably provide temporary pulses of auxiliary reserve current 214 to supplement base current 213 so as to produce a temporarily elevated supply current ($I_{CC}$) 215 to power multi-power mode processing device 105 while multi-power mode processing device 105 is in the second higher power mode. In this regard, auxiliary reserve current may be provided to at least partially make up for the difference between the value of the maximum base regulated current 213 and the temporary higher current level value required to power multi-power mode processing device 105 when it operates in the second higher power mode.

Figure 2A:
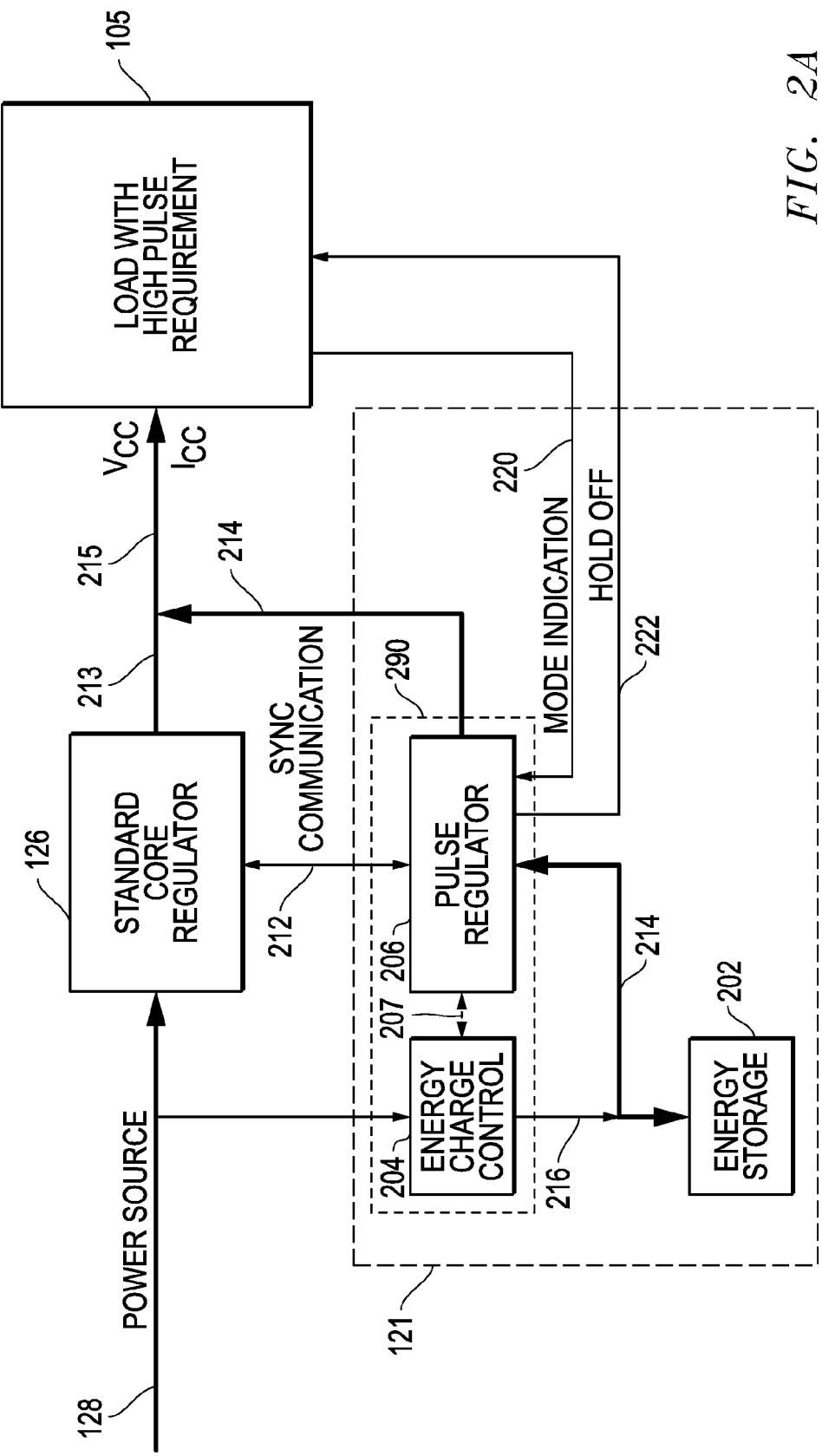
FIG. 2A is a block diagram illustrating a reserve current system in relationship to a multi-power mode processing device according to one exemplary embodiment of the disclosed systems and methods.

FIG. 2A illustrates one exemplary embodiment of a reserve current system 121 in relationship to multi-power mode processing device 105 in further detail. As shown, reserve current system 121 includes power control circuitry 290 coupled between an auxiliary energy storage power source 202 and each of system power source 128 and base regulated output current 213 of VR 126. Auxiliary energy storage power source 202 may in one embodiment be configured to store sufficient energy to provide a local and relatively low latency instantaneous auxiliary reserve current pulse 214 through reserve current pulse regulator circuitry 206 of power control circuitry 290. In this regard, reserve current pulse regulator circuitry 206 is itself is configured to control timing and duration of each pulse of auxiliary reserve current 214. In one exemplary embodiment, auxiliary energy storage power source 202 may include any one or more capacitive devices that are suitable for storing sufficient energy that may be used to provide a temporary auxiliary reserve current pulse 214 of sufficient magnitude and duration to at least partially make up for the difference between the value of regulated current 213 and the higher current level value required to power multi-power mode processing device 105 when processing device 105 temporarily operates in its second higher power mode.

Examples of suitable types of auxiliary energy storage power sources that may be employed to store energy for auxiliary energy storage power source 202 (e.g., for mobile or portable information handling system applications such as notebook computers) include, but are not limited to, ceramic capacitor devices, tantalum capacitor devices, tantalum-based or tantalum-blended capacitor devices (tantalum-ruthenium, tantalum-tantalum nitride, etc.), poly-tantalum capacitor devices having tantalum anode and poly(3,4-ethylenedioxythiolphene) cathode, etc. Other examples of suitable auxiliary energy storage devices that may be employed for auxiliary energy storage power source 202 include flywheels, batteries and supercapacitors such as electrochemical double-layer capacitors and psuedocapacitors, and hybrid capacitors (i.e., combining both double layer capacitance and pseudocapacitance) such as lithium-ion capacitors. Other examples of capacitors that may in one embodiment be employed for non-portable applications such as desktop computers, servers or larger (e.g., non-portable battery powered) information handling systems include, but are not limited to, aluminum electrolyte capacitor type devices.

Still referring to FIG. 2A, auxiliary energy storage power source 202 may be coupled as shown to system power source 128 via energy charge control circuitry 204 of power control circuitry 290 that is configured to control flow of current 216 to recharge auxiliary energy storage power source 202 from system power source 128. Energy charge control circuitry 204 may be implemented, for example, using any suitable switching circuitry such as digital or analog controlled metal-oxide semiconductor field-effect transistor (MOSFET) switching circuitry together with an integral digital or analog state controller to control flow of current 216 from system power source 128 used to recharge auxiliary energy storage power source 202, e.g., when auxiliary energy storage power source 202 is at least partially depleted from a substantially fully charged state. In this regard, charge state of energy storage power source 202 may be sensed and monitored in one embodiment by energy charge control circuitry 204 (e.g., by monitoring voltage or power source 202) in order to determine when charge state of energy storage power source 202 is at least partially depleted or has dropped below a recharge threshold. It will also be understood that operation of energy charge control circuitry 204 may alternatively be controlled using an external digital or analog state controller processing device, to keep auxiliary energy storage power source 202 recharged when needed.

In one embodiment, energy charge control circuitry 204 may also be optionally configured to prevent recharging of auxiliary energy storage power source 202 when information handing system is operating in a power mode where multi-power mode processing device 105 is in a non-operating standby state, such as one of Advanced Configuration and Power Interface (ACPI) standby states S1, S2, S3, S4. Other possible such standby states include device states D1, D2, D3, and processor states C1, C2, C3. In this regard, energy charge control circuitry 204 may determine when multi-power mode processing device 105 is in a non-operating standby state, for example, based on an optional signal provided from processing device 105, e.g., provided through signal 207 received from pulse regulator 206 or a signal provided directly from CPU 105 or in any other suitable manner. By ceasing recharging during such standby states, current leakage from auxiliary energy storage power source 202 may be reduced or substantially prevented during such times.

Reserve current pulse regulator circuitry 206 may be implemented using any suitable circuitry that is configured to control timing and duration of each auxiliary reserve current pulse 214 provided from auxiliary energy storage power source 202 to multi-power mode processing device 105. In this regard, power detection circuitry or logic may be implemented within power control circuitry 290 (e.g., as firmware running on integrated or external controller that controls operation of reserve current pulse regulator circuitry 206). Such power detection circuitry may be configured to detect initiation and cessation of a second high power mode (e.g., such as CPU Turbo Boost mode) based on receipt of synchronization communication signal provided across signaling interface 212 from VR 126, receipt of optional mode indication (e.g., boost) signal 220 from processing device 105, and/or based on any other suitable synchronization signal or other electrical measurement or indication that is indicative of the initiation and cessation of the second high power mode. For example, power detection circuitry of power control circuitry 290 may be configured in one exemplary embodiment to monitor serial or parallel Intel Voltage ID ("VID") signal or other suitable signal provided from processing device 105 to VR 126 that is indicative of initiation or cessation of higher power (Turbo) mode.

Figure 3:
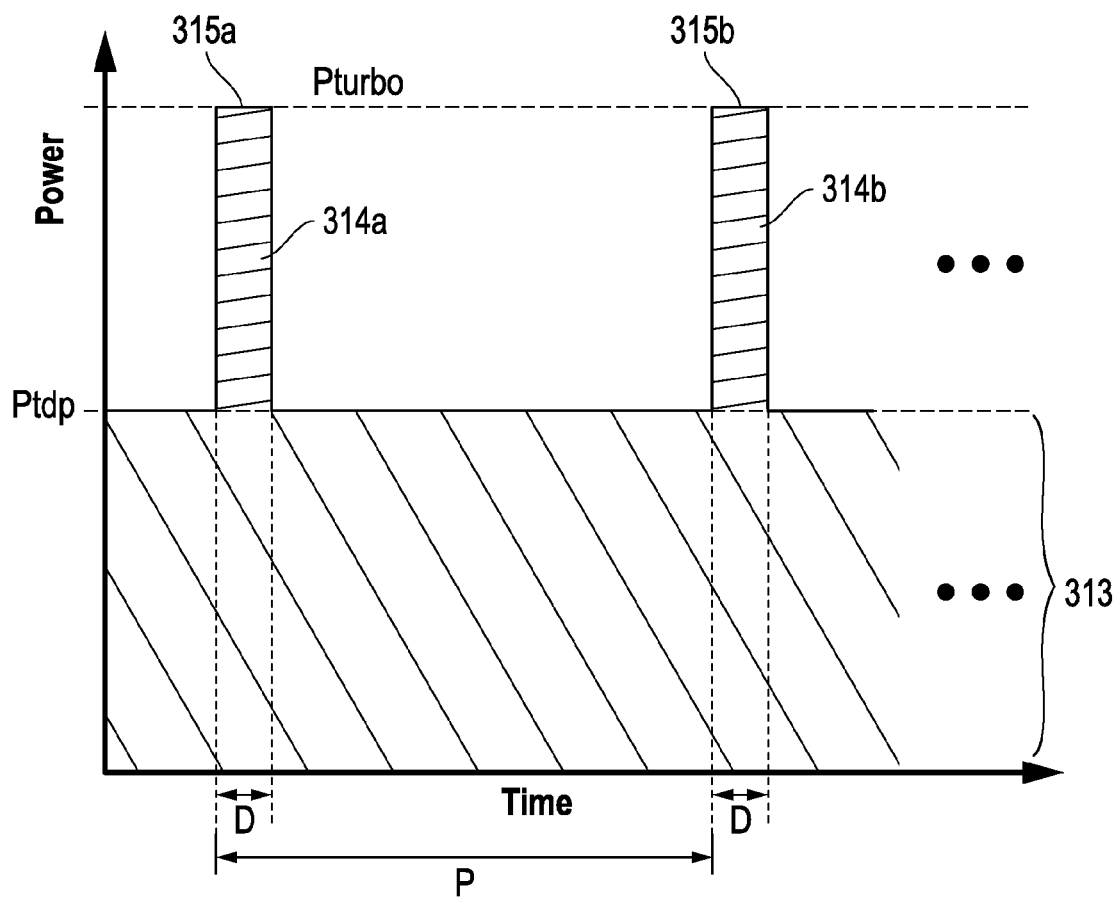
FIG. 3 illustrates an example plot of supply power versus time for a multi-power mode processing device according to one exemplary embodiment of the disclosed systems and methods.

In one exemplary embodiment, reserve current pulse regulator circuitry 206 of power control circuitry 290 may include switching circuitry (e.g., MOSFET switching circuitry) and an integral analog or digital controller that controls the switching circuitry to provide a temporary pulse or pulses of auxiliary reserve current 214 from auxiliary energy storage power source 202 when it is detected (e.g., from synchronization communication signal across signaling interface 212) that the multi-power mode processing device 105 has entered the second higher power mode (e.g., entering a "Turbo Boost" or other dynamic overclocked mode, adding more active processing cores, implementing multi-GPU operations, etc.). During such a time, the combination of base regulated current 213 from system power source 128 and a temporary pulse of auxiliary reserve current 214 from auxiliary energy storage power source 202 together produce a temporarily elevated supply current ($I_{CC}$) 215 suitable for at least partially or completely meeting the current requirements of multi-power mode processing device 105 during the initiation of the second higher power mode as shown in FIG. 3 described below. It will also be understood that power control circuitry 290 may in one embodiment include one or more common processing devices that control one or more of the tasks of reserve current pulse regulator circuitry 206, energy charge control circuitry 204, and power detection circuitry of power control circuitry 290.

In one embodiment, synchronization communication signal 212 across a signal signaling interface may be provided from VR 126 to reserve current pulse regulator circuitry 206 as an indication to reserve current pulse regulator circuitry 206 when multi-power mode processing device 105 enters and exits the second higher power mode. In one embodiment, such a synchronization signal 212 may be in the form of a boost pulse request signal generated in real time by VR 126 in response to receipt by VR 126 of a request to enter (and then exit) the higher power mode level from processing device 105. In response to an indication (from synchronization signal 212 or other suitable indication) that multi-power mode processing device 105 is entering a second higher power mode and requires a higher power mode pulse, reserve current pulse regulator circuitry 206 reacts in real time by immediately providing a pulse of auxiliary reserve current 214 from auxiliary energy storage power source 202 to multi-power mode processing device 105 to supplement the regulated base current 213 provided to the multi-power mode processing device 105 in order to meet the elevated $I_{CC}$ current requirement 215 during the duration of the second higher power mode pulse. Similarly, in response to an indication (from synchronization signal 212 or other suitable indication) that multi-power mode processing device 105 is exiting the second higher power mode, reserve current pulse regulator circuitry 206 reacts in real time by terminating the pulse of auxiliary reserve current 214 from auxiliary energy storage power source 202.

During the duration of each auxiliary reserve current pulse 214, the combination of base regulated current 213 from system power source 128 and the temporary auxiliary reserve current pulse 214 from auxiliary energy storage power source 202 results in a temporarily elevated supply current ($I_{CC}$) 215 that is greater than the maximum base regulated current 213 available from VR 126 and system power source 128. During each auxiliary reserve current pulse 214, elevated supply current ($I_{CC}$) 215 is sufficient for meeting the current inrush experienced by multi-power mode processing device 105 when it operates in the second higher power mode.

It will be understood that in one exemplary embodiment a synchronization signal 212 may also optionally specify one of two or more different possible levels of auxiliary reserve current pulse 214 to be provided from auxiliary energy storage power source 202, and reserve current pulse regulator circuitry 206 may respond in kind by providing the specified level of auxiliary reserved current pulse 214. As previously indicated, power detection circuitry within power control circuitry 290 may detect initiation and cessation of a second higher power mode of multi-power level processing device 105 based on any other suitable synchronization signal or other electrical measurement or indication that is indicative of the initiation and cessation of the second high power mode.

FIG. 3 illustrates an example plot of supply power versus time for a multi-power mode processing device 105 as it may occur during a higher power mode of multiprocessing device 105 in one embodiment. As shown in FIG. 3, VR 126 provides a continuous average normal power level 313 (denoted in FIG. 3 as "Ptdp" in this embodiment) to multi-power mode processing device 105. This average normal power level 313 corresponds to base regulated current 213 provided by VR 126 in FIG. 2A. Also shown in FIG. 3 are temporarily pulses 315a, 315b, etc. of a higher power mode level 315 (equal to "Pturbo" in this embodiment) that may be provided to multi-power mode processing device during a higher processing device power mode of multi-power mode processing device 105. Each of temporary pulses 315 in FIG. 3 have a worst case maximum duration "D" (i.e., "D" cannot be longer) that may occur with a worst case minimum period "P" (i.e., "P" cannot be shorter) as shown and correspond to pulses of elevated supply current 215 provided to processing device 105 in FIG. 2A. As shown, occurrence of auxiliary reserve current pulses 214 are synchronized in real time with higher power mode pulses 315 as they occur to result in corresponding pulses of auxiliary reserve power 314 that occurs simultaneously with each occurrence of higher power mode pulses 315 (i.e., with the same duration "D" and minimum period "P"). It will be understood that at lower processing loads, multi-mode processing device 105 may vary values of "D" and "P", e.g., the value of "D" may be adjusted shorter than worst case and/or value of "P" may be adjusted longer than worst case for actual processing loads less than maximum.

In the above-described embodiment, intermittent pulses of auxiliary reserve current 214 may be initiated and synchronized with required higher power mode pulses 315 upon detection that multi-power mode processing device 105 is initiating and then ceasing a higher power mode. In this regard, each auxiliary reserve current pulse 214 is of a duration of time that is sufficient to satisfy the duration of temporary elevated supply current 215 during the temporarily higher power mode pulses 315. Thus, the energy storage capacity, current delivery rate, and required recharge time for auxiliary energy storage power source 202 may be accordingly selected in one embodiment to meet the difference between base regulated current 213 and higher power during the duration of each of the second higher power mode pulses 315 and to sufficiently recharge from system power source 128 between pulses 315.

For example, referring to FIG. 3, given a particular maximum (worst case) known high power mode pulse duration "D" and minimum (worst case) period "P" that may occur for a given multi-power mode processing device 105, storage device 202 may be selected to have an energy storage capacity and recharge rate such that capacitive storage device is capable of sufficiently recharging from system power source 128 in the worst case minimum time period "P" that may occur between high power mode pulses 315 in order to provide sufficiently high reserve current pulses 214 to produce sufficient higher power mode pulses 315 required to achieve the worst case duration Pturbo level. After delivering each current pulse 214, reserve current pulse regulator circuitry 206 may cease providing the pulse of auxiliary reserve current 214 from auxiliary energy storage power source 202 during the recharge time to allow auxiliary energy storage power source 202 to be recharged from system power source 128 under control of energy charge control circuitry 204. Following the recharge time, reserve current pulse regulator circuitry 206 is ready to again provide a pulse of auxiliary reserve current 214.

In one exemplary implementation for an IMVP-capable VR 126 coupled to a 17 Volt system power source 128, a capacitive energy storage device 202 having a capacitance of about 2200 microfarads may be capable of producing an intermittent 20 Amp auxiliary reserve current pulse 214 to meet high power mode pulses 315 having a maximum duration "D" of about 10 milliseconds. Capacitive energy storage device 202 may be further selected to substantially fully recharge in a minimum time of about 100 milliseconds between each pair of such auxiliary reserve current pulses 214 (i.e. corresponding to a minimum period "P" of about 110 milliseconds and a duty cycle of about 9%). However, it will be understood that these values are exemplary only, and that any other suitable timing and capacitive storage device characteristics may be employed that is suitable for a given combination of characteristics of multi-power mode processing device 105, VR 126 and system power source 128.

As previously described, it will be understood that reserve current pulse regulator circuitry 206 may be configured to respond to any other additional or alternative suitable type of synchronization communication signal or measurement that is suitable for indicating the initiation and cessation of a temporary second higher power mode of multi-power mode processing device 105. It is also possible that such a communication signal/s may be provided by circuitry other than VR 126, such as directly from multi-power mode processing device 105. For example, FIG. 2A illustrates optional mode indication signal 220 that may be provided from multi-power mode processing device 105 to indicate to reserve current pulse regulator circuitry 206 that processing device 105 is entering a second high power mode such as previously described, and that a pulse of auxiliary reserve current 214 is needed to supplement base regulated current 213 in order to produce a temporarily elevated supply current ($I_{CC}$) 215 to power multi-power mode processing device 105 while multi-power mode processing device 105 is in the second higher power mode. In another exemplary embodiment, it is also possible that a mode indication signal 220 may be provided from multi-power mode processing device 105 to reserve current pulse regulator circuitry 206 without the presence of a synchronization communication signal 212.

FIG. 2A also illustrates an optional hold off signal 222 that may be provided from reserve current pulse regulator circuitry 206 to multi-power mode processing device 105 (e.g., as a control flag, register value, etc.) to indicate that auxiliary energy storage power source 202 is not currently ready to deliver a pulse of reserve current 214. In such an exemplary embodiment, multi-power mode processing device 105 may delay entering a second higher power mode until condition of signal 222 indicates that auxiliary energy storage power source 202 is ready to deliver a pulse of reserve current 214 to multi-power mode processing device 105. When condition of signal 222 indicates that auxiliary energy storage power source 202 is ready to deliver a pulse of reserve current 214, multi-power mode processing device 105 may then enter the second higher power mode as needed and reserve current pulse regulator circuitry 206 may provide a pulse of auxiliary reserve current 214 from auxiliary energy storage power source 202 as described elsewhere herein.

Referring to FIG. 3 as an example, such an optional hold off signal 222 may be employed, for example, in one alternate embodiment to allow the use of a "less than worst case" or undersized (e.g., smaller and/or lighter) auxiliary energy storage power source 202 that requires a greater length of time than the worst case minimum time period "P" to sufficiently recharge from power source 128 to provide a sufficient reserve current pulse 214 to achieve the worst case Pturbo level. Such a reduced size auxiliary energy storage power source 202 may be sized to meet high power mode pulses of shorter duration (i.e., shorter than worst case duration "D") required by a typical user under typical operating conditions. In such an embodiment, reserve current pulse regulator circuitry 206 may monitor the real time charge level (e.g., voltage) of auxiliary energy storage power source 202 and assert hold off signal 222 to multi-power mode processing device 105 to prevent processing device 105 from entering the second higher power mode until such time that reserve current pulse regulator circuitry 206 detects that auxiliary energy storage power source 202 is recharged and ready to provide a sufficient reserve current pulse 214 to achieve the worst case Pturbo level.

Figure 2B:
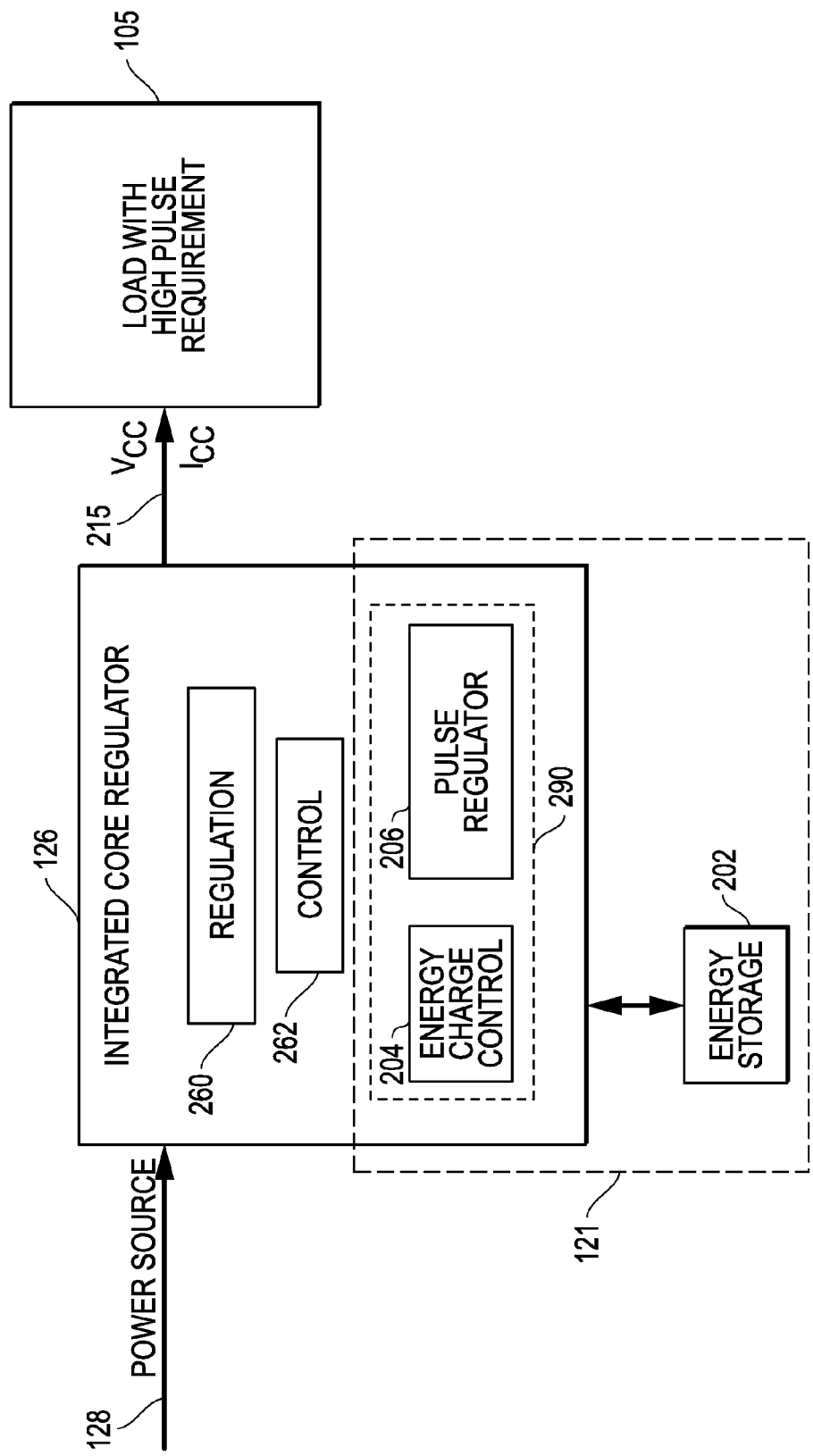
FIG. 2B is a block diagram illustrating a reserve current system in relationship to a multi-power mode processing device according to one exemplary embodiment of the disclosed systems and methods.

FIG. 2B illustrates another exemplary embodiment in which one or more components of a reserve current system 121 (e.g., in this example components of case power control circuitry 290) may be integrated within a VR 256, in this case together with VR controller 262. In such an embodiment, components of reserve current system 121 may function as otherwise described herein, and in synchronous or asynchronous manner. Moreover, controller 262 may be employed to interface with multi-power level processing power device 105, e.g., to receive and understand IMVP and VID command, etc.

Although the disclosed systems and methods have been illustrated herein for providing auxiliary reserve current to power a system load of particular configuration/s of a battery-powered information handling system 100, it will be understood that the disclosed systems and methods may be employed to similarly provide auxiliary reserve current for any other configuration of battery-powered information handling system or non-battery powered information handling system (e.g., such as server or desktop computer) having a varying system load, such as a multi-power mode processing device. It will also be understood that the disclosed systems and methods may be implemented by any one or more processing devices of an information handling system, e.g., such as by separate integrated controller of charge control circuitry 204 and integrated controller of reserve current pulse regulator circuitry 206. Alternatively, a common processing device may be coupled to control both charging and auxiliary reserve current pulses. In the latter case, it is possible that an external controller may be coupled to control switching circuitry of both charge control circuitry 204 and reserve current pulse regulator circuitry 306.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will also be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:
1. An information handling system, comprising:
at least one multi-power mode processing device that is configured to operate in a first power mode having a first power consumption level and to temporarily operate in a separate second higher power mode having a second power consumption level, the second power consumption level being greater than the first power consumption level;
first voltage regulator (VR) circuitry having an input coupled to receive an input system power source and an output coupled to provide power to the multi-power mode processing device, the VR circuitry being configured to regulate current received from the input system power source to produce a base regulated current output that is sufficient to power the multi-power mode process- ing device at the first power consumption level but not at the second power consumption level; and a reserve current system comprising an auxiliary energy storage power source that includes one or more energy storage devices coupled to be selectably charged with stored battery energy taken from the input system power source, and the reserve current system being configured to selectably release the stored energy from the auxiliary energy storage power source as auxiliary reserve current sufficient to supplement the base regulated current of the VR circuitry output to power the multi-power mode processing device at the second power consumption level;

where the reserve current system includes second regulator circuitry coupled between the auxiliary energy storage power source and the multi-power mode processing device and is configured to selectably provide a temporary pulse of the auxiliary reserve current through the second regulator to supplement the regulated base current provided to the multi-power mode processing device upon initiation of the second power mode and during the time when the multi-power mode processing device is operating in the second power mode and such that the auxiliary reserve current from the auxiliary energy storage power source is disconnected from the multi-power mode processing device at all other times.

2. The system of claim 1, where the reserve current system is further configured to selectably charge the auxiliary energy storage power source with stored energy taken from the input system power source that is separate from the base regulated current of the VR circuitry.

3. The system of claim 1, where the multi-power mode processing device is configured to operate in the second higher power mode in temporary pulses, each of the pulses of second higher power mode having a maximum duration "D" and being separated from an adjacent pulse of the second higher power mode by a minimum time period "P"; where the reserve current system is configured to selectably provide temporary pulses of the auxiliary reserve current through the second regulator to power the multi-power mode processing device that are synchronized in real time with the higher power mode pulses of the multi-power mode processing device as they occur so as to result in corresponding pulses of the auxiliary reserve current that occur simultaneously with each occurrence of the higher power mode pulses and with the same duration period as the higher power mode pulses; and where the reserve current system is configured to recharge the auxiliary energy storage power source between the temporary pulses of the second higher power mode in a charge time that is less than or equal to the minimum time period "P" with stored energy taken from the input system power source to a stored energy level that is sufficient to supplement the base regulated current of the VR circuitry output to power the multi-power mode processing device at the second power consumption level.

4. The system of claim 3, where the auxiliary energy storage power source comprises one or more capacitive storage devices sized to be capable of sufficiently recharging from the input system power during within the worst case minimum time period "P" that occurs between the higher power mode pulses in order to provide pulses of the auxiliary reserve current that are sufficient to produce higher power mode pulses of the maximum duration "D".

5. The system of claim 3, where each of the pulses of the second higher power mode have a maximum duration "D" of about 10 milliseconds.

6. The system of claim 5, where the reserve current system is configured to recharge the auxiliary energy storage power source between the temporary pulses of the second higher power mode in a charge time that is less than or equal to about 110 milliseconds with stored energy taken from the input system power source to a stored energy level that is sufficient to supplement the base regulated current of the VR circuitry output to power the multi-power mode processing device at the second power consumption level.

7. The system of claim 1, where the reserve current system comprises:

power detection circuitry configured to detect a duration of a temporary second higher power mode of the multi-power mode processing device;

charge control circuitry for controlling charging of the auxiliary energy storage power source with stored energy from the system power source; and a power control circuit to selectively enable and disable an auxiliary power mode of the reserve current system to selectably provide a temporary pulse of auxiliary reserve current to supplement the regulated base current provided to the multi-power mode processing device during the detected duration of the temporary second higher power mode of the multi-power mode processing device.

8. The system of claim 7, where the power detection circuitry, charge control circuitry, and power control circuit are present as circuitry integrated within the VR circuitry.

9. The system of claim 7, where the reserve current system is coupled to receive a synchronization communication signal from at least one of the VR circuitry or the multi-power mode processing device, the synchronization communication signal being indicative of initiation and cessation of the temporary second higher power mode of the multi-power mode processing device; where the power detection circuitry is configured to detect a duration of the second power mode of the multi-power mode processing device based on the initiation and cessation of the temporary second higher power mode indicated by the synchronization communication signal; and where the power control circuit is configured to respond to the detected duration of the second higher power mode of the multi-power mode processing device by providing a pulse of auxiliary reserve current from the auxiliary energy storage power source to supplement the regulated base current provided to the multi-power mode processing device during the detected duration of the second higher power mode of the multi-power mode processing device.

10. The system of claim 9, where the reserve current system further comprises a signaling interface coupled to the VR circuitry, the power detection circuitry of the reserve current system being configured to receive the synchronization communication signal from the VR circuitry across the signaling interface.

11. The system of claim 9, where the power detection circuitry is communicatively coupled to the multi-power mode processing device, and is configured to detect a duration of the second power mode of the multi-power mode processing device based on the initiation and cessation of the temporary second higher power mode indicated by a mode indication signal provided as the synchronization communication signal to the power detection circuitry from the multi-power mode processing device.

12. The system of claim 1, where the reserve current system is configured to:

release the stored energy from the auxiliary energy storage power source as auxiliary reserve current to supplement the base regulated current of the VR circuitry output provided to the multi-power mode processing device during the time that the multi-power mode processing device is operating in the second higher power mode; and release no stored energy from the auxiliary energy storage power source as auxiliary reserve current to supplement the base regulated current of the VR circuitry output provided to the multi-power mode processing device during the time that the multi-power mode processing device is operating in the first power mode.

13. The system of claim 1, where the reserve current system is further configured to detect when the at least one multi-power mode processing device is in a non-operating standby state; and to respond to the detection of the processing device non-operating standby state by not charging the auxiliary energy storage power source with stored energy taken from the input system power source during the time that the multi-power mode processing device is in the non-operating standby state.

14. The system of claim 1, where the reserve current system is communicatively coupled to the multi-power mode processing device, and is configured to assert a hold signal to the multi-power mode processing device to indicate that the reserve current system is not currently ready to deliver a pulse of auxiliary reserve current to supplement the regulated base current provided to the multi-power mode processing device; and where the multi-power mode processing device is configured to respond to the assertion of the hold off signal by preventing the second higher power mode operation for as long as the hold off signal is asserted by the reserve current system.

15. The system of claim 1, where the information handling system comprises a battery powered information handing system.

16. The system of claim 1, where the auxiliary energy storage power source comprises one or more capacitive storage devices, the capacitive storage devices being coupled to be selectably charged by the reserve current system with current taken from the input system power source; and where the reserve current system is further configured to selectably release the stored energy from the capacitive storage devices as auxiliary reserve current sufficient to supplement the base regulated current of the VR circuitry output to power the multi-power mode processing device at the second power consumption level.

17. The system of claim 1, where the reserve current system is configured to disconnect and prevent recharging of the auxiliary energy storage power source from the input system power source when the multi-power mode processing device is in a non-operating standby power mode.

18. The system of claim 1, where the reserve current system is further configured to sense the charge state of the auxiliary energy storage power source, and to selectably charge the auxiliary energy storage power source with stored energy taken from the input system power source when the sensed charge state of the auxiliary energy storage power source drops below a recharge threshold.

19. The system of claim 1, where the first regulator circuitry is coupled to receive a request to enter and a request to exit the second higher power mode from the multi-power mode processing device, and to generate a synchronization communication signal based on the request to enter and the request to exit the second higher power mode to indicate initiation and cessation of the second high power mode; where the second regulator circuitry is coupled to receive the synchronization communication signal from the first regulator circuitry reserve current system to detect initiation and cessation of the second high power mode; and where the second regulator circuitry is configured to immediately provide in real time a temporary pulse of the auxiliary reserve current from the auxiliary energy storage power source when it is detected from the synchronization communication signal that the multi-power mode processing device has entered the second higher power mode, and to immediately cease providing in real time the temporary pulse of the auxiliary reserve current from the auxiliary energy storage power source when it is detected from the synchronization communication signal that the multi-power mode processing device has exited the second higher power mode.

20. The system of claim 1, where the second regulator circuitry is coupled to receive a mode indication signal from the multi-power mode processing device to detect initiation and cessation of the second high power mode; and where the second regulator circuitry is configured to immediately provide in real time a temporary pulse of the auxiliary reserve current from the auxiliary energy storage power source when it is detected from the mode indication signal that the multi-power mode processing device has entered the second higher power mode; and to immediately cease providing in real time the temporary pulse of the auxiliary reserve current from the auxiliary energy storage power source when it is detected from the mode indication signal that the multi-power mode processing device has exited the second higher power mode.

21. The system of claim 1, where the second regulator circuitry is coupled to monitor the real time charge level of the auxiliary energy storage power source and is coupled to assert a hold off signal to the multi-power mode processing device to indicate that the auxiliary energy storage power source is not sufficiently charged to provide a sufficient temporary pulse of auxiliary reserve current to achieve a temporary pulse of the second higher power mode; and where the multi-power mode processing device is configured to respond to the asserted hold off signal by delaying entering the second higher power mode for as long as the hold off signal is asserted by the second regulator circuitry such that the multi-power mode processing device does not enter the second higher power mode until the second regulator circuitry stops asserting the hold off signal upon detection by the second regulator circuitry that the charge level of the auxiliary energy storage power source is sufficient to provide a sufficient temporary pulse of auxiliary reserve current to achieve the temporary pulse of the second higher power mode.

22. The system of claim 1, where the second higher power mode is a dynamic overclocking mode in which the multi-power mode processing device runs at a higher clock rate than its base operating frequency, initiates multiprocessing addition of more processing cores, implements multi graphics processing unit (GPU) operations, or exceeds its rated Thermal Design Power (TDP).

23. A method for providing auxiliary reserve current to power a multi-power mode processing device of an information handing system, the method comprising: operating the multi-power mode processing device in a first power mode having a first power consumption level and temporarily operating the multi-power mode processing device in a separate second higher power mode having a second power consumption level, the second power consumption level being greater than the first power consumption level; receiving current from an input system power source in an input of a first voltage regulator (VR) circuitry and regulating the received input current to produce a base regulated current output that is sufficient to power the multi-power mode processing device at the first power consumption level but not at the second power consumption level; selectably charging one or more energy storage devices of an auxiliary energy storage power source with stored battery energy taken from the input system power source; and using a second regulator circuitry of a reserve current system to selectably release the stored energy from the auxiliary energy storage power source as a temporary pulse of auxiliary reserve current through the second regulator that is sufficient to supplement the base regulated current of the VR circuitry output to power the multi-power mode processing device at the second power consumption level upon initiation of the second power mode and when the multi-power mode processing device is operating in the second power mode, and to disconnect the auxiliary reserve current of the auxiliary energy storage power source from the multi-power mode processing device at all other times.

24. The method of claim 23, further comprising:
operating the multi-power mode processing device in the second higher power mode in temporary pulses, each of the pulses of second higher power mode having a maximum duration "D" and being separated from an adjacent pulse of the second higher power mode by a minimum time period "P";
using the second regulator circuitry of the reserve current system to selectably provide temporary pulses of the auxiliary reserve current through the second regulator to power the multi-power mode processing device that are synchronized in real time with the higher power mode pulses of the multi-power mode processing device as they occur so as to result in corresponding pulses of the auxiliary reserve current that occur simultaneously with each occurrence of the higher power mode pulses and with the same duration period as the higher power mode pulses; and
recharging the auxiliary energy storage power source between the temporary pulses of the second higher power mode in a charge time that is less than or equal to the minimum time period "P" with stored energy taken from the input system power source to a stored energy level that is sufficient to supplement the base regulated current of the VR circuitry output to power the multi-power mode processing device at the second power consumption level.

25. The method of claim 24, where each of the pulses of the second higher power mode have a maximum duration "D" of about 10 milliseconds.

26. The method of claim 25, further comprising recharging the auxiliary energy storage power source between the temporary pulses of the second higher power mode in a charge time that is less than or equal to about 110 milliseconds with stored energy taken from the input system power source to a stored energy level that is sufficient to supplement the base regulated current of the VR circuitry output to power the multi-power mode processing device at the second power consumption level.

27. The method of claim 23, further comprising:
detecting a duration of a temporary second higher power mode of the multi-power mode processing device; and
selectably providing a temporary pulse of auxiliary reserve current to supplement the regulated base current provided to the multi-power mode processing device during the detected duration of the temporary second higher power mode of the multi-power mode processing device.

28. The method of claim 27, further comprising:
receiving a synchronization communication signal from at least one of the VR circuitry or the multi-power mode processing device, the synchronization communication signal being indicative of initiation and cessation of the temporary second higher power mode of the multi-power mode processing device;
detecting a duration of the second power mode of the multi-power mode processing device based on the initiation and cessation of the temporary second higher power mode indicated by the synchronization communication signal; and
responding to the detected duration of the second higher power mode of the multi-power mode processing device by providing a pulse of auxiliary reserve current from the auxiliary energy storage power source to supplement the regulated base current provided to the multi-power mode processing device during the detected duration of the second higher power mode of the multi-power mode processing device.

29. The method of claim 28, further comprising receiving the synchronization communication signal from the VR circuitry.

30. The method of claim 29, further comprising detecting a duration of the second power mode of the multi-power mode processing device based on the initiation and cessation of the temporary second higher power mode indicated by a mode indication signal provided as the synchronization communication signal from the multi-power mode processing device.

31. The method of claim 23, further comprising:
releasing the stored energy from the auxiliary energy storage power source as auxiliary reserve current to supplement the base regulated current of the VR circuitry output provided to the multi-power mode processing device during the time that the multi-power mode processing device is operating in the second higher power mode; and
releasing no stored energy from the auxiliary energy storage power source as auxiliary reserve current to supplement the base regulated current of the VR circuitry output provided to the multi-power mode processing device during the time that the multi-power mode processing device is operating in the first power mode.

32. The method of claim 23, further comprising detecting when the at least one multi-power mode processing device is in a non-operating standby state; and responding to the detection of the processing device non-operating standby state by not charging the auxiliary energy storage power source with stored energy taken from the input system power source during the time that the multi-power mode processing device is in the non-operating standby state.

33. The method of claim 23, further comprising asserting a hold signal to the multi-power mode processing device when it is determined that the auxiliary energy storage power source is not sufficiently charged with energy to allow delivery of a pulse of auxiliary reserve current to supplement the regulated base current provided to the multi-power mode processing device; and responding to the assertion of the hold off signal by preventing the multi-power mode processing device from entering the second higher power mode for as long as the hold off signal is asserted.

34. The method of claim 23, further comprising using the reserve current system to disconnect and prevent recharging of the auxiliary energy storage power source from the input system power source when the multi-power mode processing device is in a non-operating standby power mode.

35. The method of claim 23, further comprising using the reserve current system to sense the charge state of the auxiliary energy storage power source, and to selectably charge the auxiliary energy storage power source with stored energy taken from the input system power source when the sensed charge state of the auxiliary energy storage power source drops below a recharge threshold.

36. The method of claim 23, further comprising receiving a request to enter and a request to exit the second higher power mode in the first regulator circuitry from the multi-power mode processing device; providing a synchronization communication signal from the first regulator circuitry to the second regulator circuitry based on the request to enter and the request to exit the second higher power mode to indicate initiation and cessation of the second high power mode; using the second regulator circuitry to detect initiation and cessation of the second high power mode based on the synchronization communication signal received from the first regulator circuitry; and using the second regulator circuitry to immediately provide in real time a temporary pulse of the auxiliary reserve current from the auxiliary energy storage power source when it is detected from the synchronization communication signal that the multi-power mode processing device has entered the second higher power mode, and to immediately cease providing in real time the temporary pulse of the auxiliary reserve current from the auxiliary energy storage power source when it is detected from the synchronization communication signal that the multi-power mode processing device has exited the second higher power mode.

37. The method of claim 23, further comprising using the second regulator circuitry to:
   receive a mode indication signal from the multi-power mode processing device to detect initiation and cessation of the second high power mode;
   immediately provide in real time a temporary pulse of the auxiliary reserve current from the auxiliary energy storage power source when it is detected from the mode indication signal that the multi-power mode processing device has entered the second higher power mode; and
   immediately cease providing in real time the temporary pulse of the auxiliary reserve current from the auxiliary energy storage power source when it is detected from the mode indication signal that the multi-power mode processing device has exited the second higher power mode.

38. The method of claim 23, further comprising:
   using the second regulator circuitry to monitor the real time charge level of the auxiliary energy storage power source, and to assert a hold off signal to the multi-power mode processing device to indicate that the auxiliary energy storage power source is not sufficiently charged to provide a sufficient temporary pulse of auxiliary reserve current to achieve a temporary pulse of the second higher power mode; and
   using the multi-power mode processing device to respond to the asserted hold off signal by delaying entering the second higher power mode for as long as the hold off signal is asserted by the second regulator circuitry such that the multi-power mode processing device does not enter the second higher power mode until the second regulator circuitry stops asserting the hold off signal upon detection by the second regulator circuitry that the charge level of the auxiliary energy storage power source is sufficient to provide a sufficient temporary pulse of auxiliary reserve current to achieve the temporary pulse of the second higher power mode.

39. The method of claim 23, where the second higher power mode is a dynamic overclocking mode in which the multi-power mode processing device runs at a higher clock rate than its base operating frequency, initiates multiprocessing addition of more processing cores, implements multi graphics processing unit (GPU) operations, or exceeds its rated Thermal Design Power (TDP).

* * * * *